(12) United States Patent
Grissom

(10) Patent No.: US 6,386,740 B1
(45) Date of Patent: May 14, 2002

(54) OUTBOARD MOTOR/OUTDRIVE SAFETY LIGHT

(76) Inventor: James M. Grissom, 950 New Haven St., Mesa, AZ (US) 85205

( * ) Notice: Subject to any disclaimer, the term of this patent is extended or adjusted under 35 U.S.C. 154(b) by 0 days.

(21) Appl. No.: 09/627,038

(22) Filed: Jul. 27, 2000

(51) Int. Cl.[7] ................................................. B60Q 1/00
(52) U.S. Cl. ...................... 362/477; 362/485; 362/486; 362/549; 362/396
(58) Field of Search ................................. 362/477, 485, 362/486, 549, 396; 114/343; 340/984

(56) References Cited

U.S. PATENT DOCUMENTS

| | | | |
|---|---|---|---|
| 2,907,295 A | | 10/1959 | Delaney |
| 3,080,581 A | | 3/1963 | Smihal |
| 3,870,875 A | | 3/1975 | Altimus |
| 4,947,304 A | * | 8/1990 | Payne et al. ................ 362/267 |
| 5,134,385 A | * | 7/1992 | Coleman .................... 340/473 |
| 5,285,113 A | * | 2/1994 | Schlich ....................... 307/9.1 |
| 5,544,022 A | | 8/1996 | Blackard |
| 5,613,886 A | | 3/1997 | Cribbs |
| 5,725,228 A | | 3/1998 | Livingston |
| 5,980,073 A | | 11/1999 | Whipple |

* cited by examiner

Primary Examiner—Stephen Husar
Assistant Examiner—Guiyoung Lee
(74) Attorney, Agent, or Firm—LaValle D. Ptak

(57) ABSTRACT

A safety light assembly is designed for use with an outboard, motor or the outdrive unit of a motor mounted on a boat which is carried on a trailer being towed by a towing vehicle. The safety light assembly is removably secured to the anti-cavitation plate of the drive housing of the motor or outdrive unit by means of clamps. The assembly includes a housing with a central light-supporting portion between first and second flanges located on opposite sides of the central light-supporting portion. A light is attached to the central light-supporting portion of the housing; and the flanges are removably secured by means of clamps to the anti-cavitation plate on the drive housing of an outboard motor, or outdrive unit. Electrical connectors interconnect the light with a source of electrical energy, which ideally is the lighting system of the taillights of a boat trailer.

13 Claims, 2 Drawing Sheets

OUTBOARD MOTOR/OUTDRIVE SAFETY LIGHT

BACKGROUND

Fishermen and motorboat enthusiasts frequently transport their boats on a trailer to and from a body of water. Outboard motorboats and motorboats provided with an inboard engine and an outdrive unit generally are hauled on trailers, with the outboard motor mounted on the transom of the boat, or the outdrive unit extending from the stern of the boat. Boat trailers necessarily have the taillights and brake lights mounted at a generally low level above the road surface; and the boat is located on the trailer above the level of these lights. The reason for this is that the trailer acts as a supporting frame for the underside of the boat to permit the boat to be released from and moved onto the trailer when the trailer is backed into the water.

Because of the low position of the taillights on boat trailers, the lights are frequently difficult to be seen by a driver in a vehicle following the trailer. The taillights and brake lights of automobiles and other vehicles generally are mounted at a rather high level. In addition, newer vehicles all carry a centrally-located, high-mounted brake light to improve the chances of a vehicle being seen by a following vehicle whenever the brakes are applied. As a consequence, when the only lights visible to a following vehicle are low mounted lights on a trailer, a safety hazard is present, creating the potential for a collision between a following vehicle and the protruding drive of an outboard motor or the outdrive unit of an inboard/outboard combination.

In order to improve the visibility of a boat being towed on a trailer to following vehicles, various attempts have been made in the past for providing higher-mounted brake lights or taillights to be seen by following drivers. Two such attempts, which require some modification to the boat itself, are disclosed in the United States patents to Blackard U.S. Pat. No. 5,544,022 and Livingston U.S. Pat. No. 5,725,228. In both of these patents, the boat which is to be towed is itself provided with a set of lights mounted near its stern, or on the transom. These lights then are provided with a cable for connection to the taillight assembly of the towing vehicle. A problem with the devices of both Blackard and Livingston, however, is that a modification of the boat itself is required in order to provide the higher-mounted taillight/brake light lights. The boat must be designed for this purpose. Most boats, however, are not so designed.

Another approach which has been taken is disclosed in the United States patent to Cribbs U.S. Pat. No. 5,613,886. This patent is directed to a light mounted to the outside housing or cowling of an outboard motor, which then may be connected to the lights of the trailer on which the boat and motor are being towed. The light is permanently mounted on the motor cowling, and remains in place even when the boat and motor no longer are on a towing trailer. An early design for providing a safety light for towed outboard motor boats is disclosed in the United States to Smihal U.S. Pat. No. 3,080,581. The device of this patent includes a transverse bar having a pair of lights on it. The bar is attached to a clamp which encircles the drive shaft housing of an outboard motor. An electrical connection between the lights on the bar with the light system for the trailer is provided. The entire assembly is removed from the drive shaft housing when the boat is to be removed from the trailer. The nature of this device is that through vibration, as the boat is being towed, the orientation of the lights can shift; and the entire assembly can move downwardly on the motor housing, unless it is very tightly clamped in place. The spring-like clamp which is disclosed, however, is not adjustable; so it would need to be custom designed for each of the different shapes of drive shaft housings on different makes and sizes of motors.

The United States to Altimus U.S. Pat. No. 3,870,875 discloses an inboard/outboard motor cover, which essentially is in the form of a large bag for completely covering the outdrive unit of an inboard/outboard motor on a boat. The bag has a light mounted near its upper side, at the rear, for connection with the taillight wire of a boat trailer; so that this light is illuminated when the taillight on the trailer is illuminated.

Yet another approach is shown in the United States patent to Whipple U.S. Pat. No. 5,980,073. Whipple addresses the problem by providing a customized housing mounted on the skeg of an outboard motor, below the propeller. The housing is held in place with a clamping bolt threaded through the housing against the skeg to lock the housing in place on the outboard motor. A light in the housing is connected to the trailer lights for illumination in conjunction with those lights. Unless the clamping bolt is very securely tightened on the skeg, vibration during towing of this unit could cause the unit to shake loose and drop to the ground, because of its location on the bottom of the skeg. In addition, potential damage to the paint or finish of the skeg is possible because of the nature of the clamping bolt used to secure the unit to the skeg. It also should be noted that the skeg is the lowermost location on the drive shaft assembly of an outboard motor or an outdrive unit; although when the boat is towed with the motor tilted or locked in its upright position, the skeg tends to be the rearmost portion of the motor unit.

It is desirable to provide a warning light for a towed boat having an outboard motor or an outdrive unit on it, which light is quickly and easily attached to the outboard motor or outdrive unit, which is not subject to the disadvantages of the prior art devices discussed above, and which easily can be seen by the driver of a vehicle following the towed boat.

SUMMARY OF THE INVENTION

It is an object of this invention to provide an improved safety light warning system.

It is another object of this invention to provide an improved safety light warning system for outboard motorboats or inboard/outboard motorboats while they are towed on a trailer.

It is an additional object of this invention to provide an improved safety light system for mounting on the drive shaft housing or outdrive housing of the motor on a towed motorboat.

It is a further object of this invention to provide a warning light for releasable attachment to the anti-cavitation plate of the drive shaft housing of an outboard motor or of an outdrive uniton a boat to place the warning light at a relatively high level when the boat is being towed on a trailer.

In accordance with a preferred embodiment of the invention, a safety light assembly is designed for use with an outboard motor or the outdrive unit of a motor mounted on a boat carried on a trailer. This assembly includes a housing with a central light-supporting portion on it. This housing also has first and second flanges located on opposite sides of the central light-supporting portion. A light is attached to the central light-supporting portion of the housing; and devices are provided for securing the first and second flanges to the anti-cavitation plate on the drive shaft housing of the motor, with the flanges overlying the plate while the securing devices hold the flanges in place on top of the anti-cavitation plate. An electrical connector is provided to interconnect the light with a source of electrical energy, which in a more specific embodiment, is provided by the taillights of the trailer on which the boat is carried.

DETAILED DESCRIPTION

Figure 1:
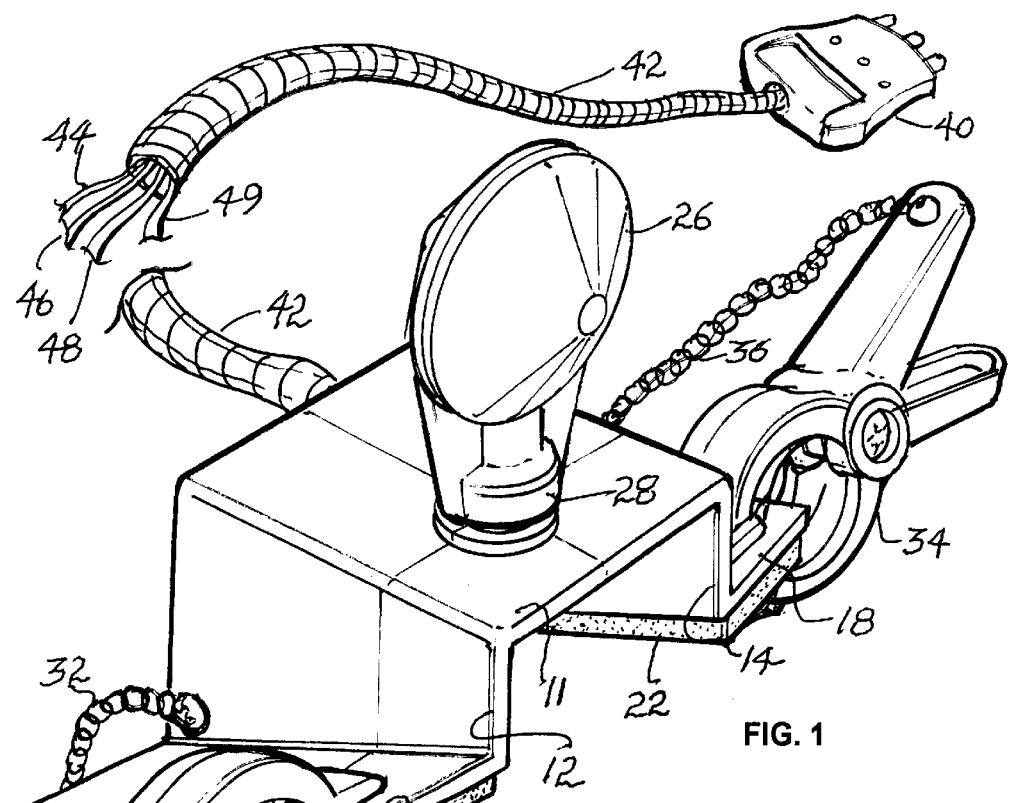
FIG. 1 is a top, front, perspective view of a preferred embodiment of the invention.

Reference now should be made to the drawings, in which the same reference numbers are used throughout the different figures to designate the same components. Primarily, reference should be made to FIGS. 1 and 2, which illustrate the various parts of a preferred embodiment of the invention.

The safety light assembly 10 which is shown in the drawings comprises a housing 10 which has a central light-supporting portion 11 on it. This portion then is connected, by means of two vertical downwardly extending sides 12 and 14, to a pair of flanges 16 and 18, which are designed to overlie the anti-cavitation plate 66 on an outboard motor or outdrive unit. As is most apparent from an examination of FIG. 1, the surface 11 is in one plane; and the flanges 16 and 18 are located in another plane which is at an angle to the plane 11, but which also is perpendicular to the sides 12 and 14. The lower surfaces of the flanges 16 and 18 are coated with a rubber-like cushioning material 20 and 22, respectively, for, purposes which are described in greater detail subsequently.

Figure 2:
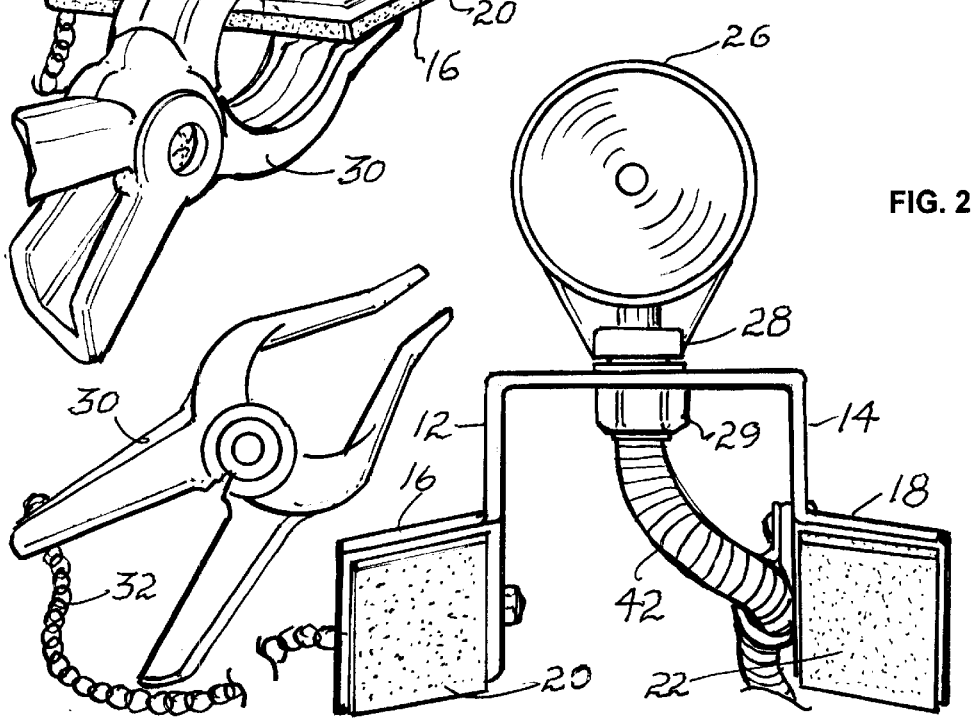
FIG. 2 is a front view of the embodiment shown in FIG. 1.

The light-supporting surface 11 has a suitable light 26 attached to it in a conventional manner, as illustrated in FIG. 2 at 28. Typically, a hole is provided through the plate 11 and a projection on the lower portion of the light assembly is extended through the hole and secured in place by means of a nut 29, as shown most clearly in FIG. 2. Electrical power for the light is, supplied through the center of the nut 29 into a column at the bottom of the light 26, through a cable 42, which is shown in both FIGS. 1 and 2.

Figure 3:
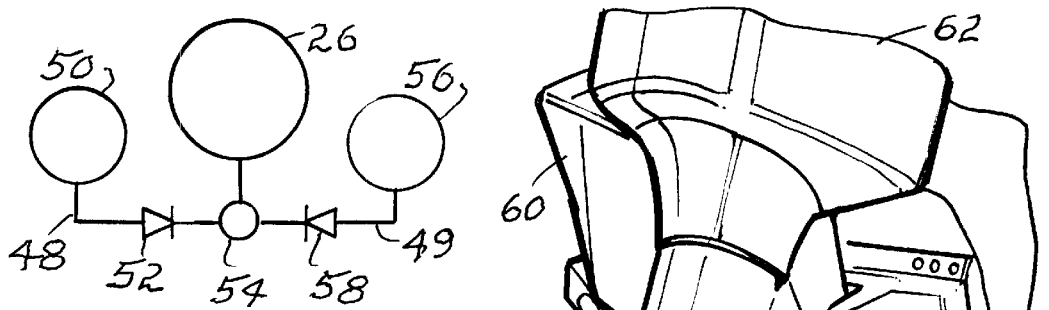
FIG. 3 is a diagrammatic representation of electrical interconnections used in conjunction with the embodiment shown in FIG. 1.

Electrical power for operating the light 26 may come from any suitable source. Ideally, however, this source of power comprises the taillights on the trailer itself; and these are depicted in FIG. 3 as taillights 50 and 56. Generally, the taillights include a lead, such as the lead 44 (FIG. 1), for the rear light itself a ground wire 46 and left and right brake/turn leads 48 and 49, as shown in FIGS. 1 and 3. To prevent signal feedthrough from the brake/turn signal lights 50 and 56, blocking diodes 52 and 58 are provided, as shown most clearly in FIG. 3. The various connections to the light 26 then are provided through the cable 42 in a conventional manner.

Figure 6:
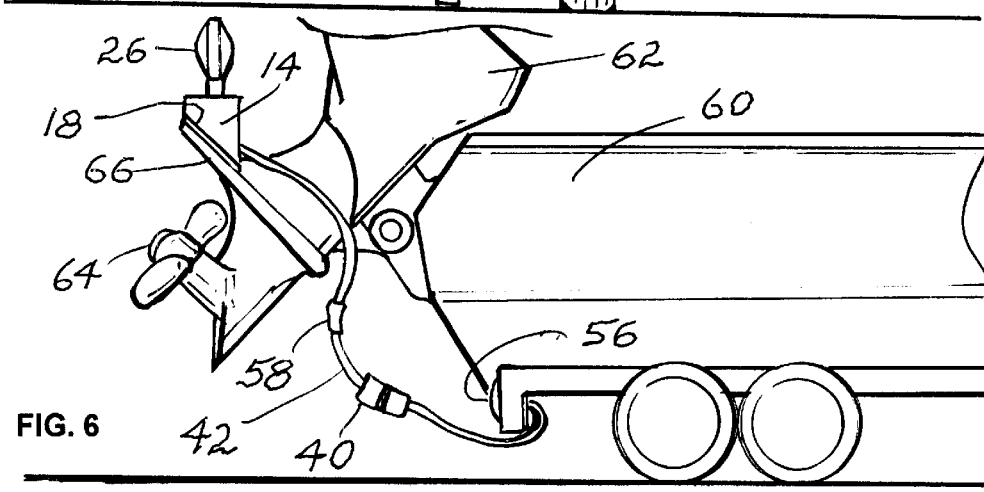
FIG. 6 is a side view illustrating the manner of mounting of the embodiment of FIG. 1 on an outboard motor.

The interconnection 40, which is illustrated in FIGS. 1 and 6, also may be of a conventional type for plugging into a receptacle on the trailer to supply the taillight and brake/turn signal energizing currents to the light 26. Ideally, the light 26 is a typical dual filament lamp where one of the filaments is illuminated by the taillight input of the trailer and the other is illuminated by the brake and/or turn signal input. It should be noted that with the wiring arrangement shown in FIG. 3, the brake/turn signal filament of the light 26 will flash whenever either of the turn signals are activated, or the brake pedal is activated in a conventional manner. The diodes 52 and 58, however, prevent turn signals from passing from one of the lamps 50 or 56 to the other, even though the lamp 26 is energized by either of them.

To mount the safety light assembly 10 on an outboard motor drive shaft housing or the outdrive unit of an inboard/ outboard power system, a pair of clamps 30 and 34 (which may be secured to the side walls 12 and 14, respectively, by means of flexible chains or ropes 32 and 36), are provided for engagement with the flanges 16 and 18, as illustrated in FIG. 1.

When a boat 60 with the outboard motor or outdrive unit attached to it is to be towed, the outboard motor 62 typically is tipped to raise the skeg above the bottom of the boat. Outboard motors typically are locked in an up or tilted position for towing at approximately a 30° angle. Typical outdrive units are tipped up to an angle of approximately 45°. These angles are relatively standard for these two types of motors; so that irrespective of the make of the motor, the anti-cavitation plate 66 (shown most clearly in FIGS. 4 and 6) of the motor is tilted to a 30° angle for an outboard motor and a 45° angle for outdrive units. To compensate for this, the angle of tilt of the flanges 16 and 18, with respect to the surface 11 on which the light 26 is mounted, is a corresponding angle. One angle is chosen for safety light assemblies to be used with outboard motors; and a different unit with a different angle is used for safety light assemblies for utilization with outdrive units.

Figure 4:
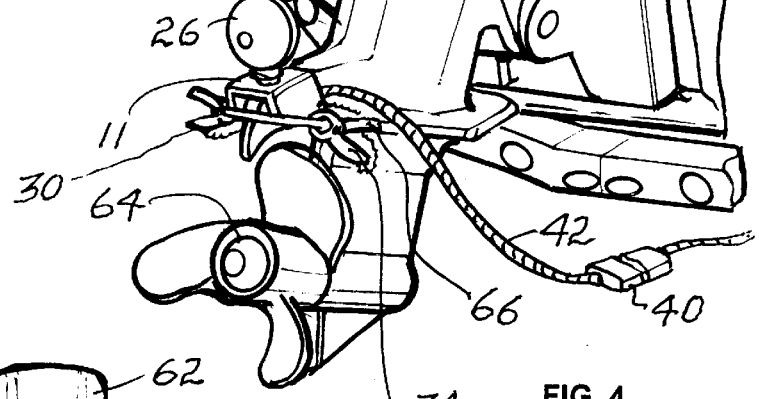
FIG. 4 shows the embodiment of the invention in FIG. 1 mounted on an outboard motor illustrating the manner of use of the invention.
Figure 5:
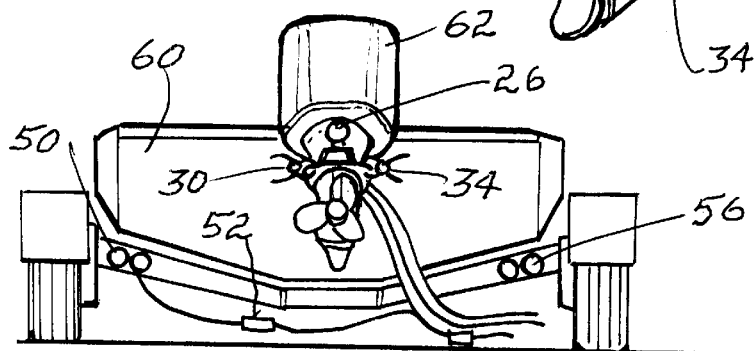
FIG. 5 is a rear view of a trailer with a boat on it and illustrating the position of mounting of the embodiment of FIG. 1.

When the motorboat 60 is to be towed, the flanges 16 and 18 are placed on opposite sides of the center line of the drive shaft housing of the outboard motor to overlie the anti-cavitation plate 66, as shown most clearly in FIGS. 4 and 5. In this position, the cushioned, non-skid surfaces 20 and 22 on the undersides of the flanges 16 and 18 rest against the upper surface of the anti-cavitation plate 66. Using a cushioned non-skid material, such as rubber or the like, accomplishes two purposes. First, the cushion prevents scratching of the finish on the top of the anti-cavitation plate 66. Secondly, the cushioned surface, when it is made of a rubberized, non-skid material, helps to hold the safety light assembly 10 firmly in place.

Once the assembly has been placed in the position shown in FIGS. 4 and 6, the clamps 30 and 34 are opened and placed over the top of the plate 16 and under the anti-cavitation plate 66, in the manner shown in FIG. 1 (which does not show the anti-cavitation plate 66). The clamps 30 and 34 are chosen to have sufficient strength to firmly hold the lamp assembly on the anti-cavitation plate 66 during towing in the orientation shown in FIG. 6 (which does not show the clamps 30 and 34 to avoid cluttering the figures). While conventional spring-type clamps 30 and 32 have been shown, other techniques for releasably or removably mounting the safety light assembly onto the anti-cavitation plate 66 may be used. The clamps 30 and 34, however, are very effective and are quick and easy to use in installing and removing the safety light assembly 10.

Once the safety light assembly has been attached to the anti-cavitation plate as shown in FIGS. 4, 5 and 6, the wiring harness 42 is attached by means of the connector 40 to the taillight assembly of the trailer (shown diagrammatically in FIG. 6). The unit then is ready for towing. It should be noted that the location of the light 26, when this unit is used with a typical boat/trailer combination, causes the light to be located approximately four feet higher above the ground than the trailer lights 50 and 56. This is readily apparent from an examination of the rear view of the trailer/boat assembly of FIG. 5 and the side view of FIG. 6. This location of the light 26 not only places it at a much higher level above the ground, but also centrally locates the light in a position which makes it much more visible to following vehicles. It also should be noted that the light 26 is located only slightly forward of the most rearward position of the propeller and skeg of the boat; so that it also provides a better visual indication of the distance between the following vehicle and the extended portions of the outboard motor drive or the outdrive unit.

The foregoing description of the preferred embodiment of the invention is to be considered as illustrative only, and not as limiting. For example, different clamp devices or attaching devices other than the clamps 30 and 34 clearly can be used. The particular shape and configuration of the light 26 also may be varied, as well as the shape of the various plates or portions of the housing. Various other changes and modifications will occur to those skilled in the art for performing substantially the same function, in substantially the same way, to achieve substantially the same result, without departing from the true scope of the invention as defined in the appended claims.

What is claimed is:

1. A safety light assembly for use with an outboard motor or the outdrive unit of a motor mounted on a boat carried on a trailer, the assembly including in combination:
   - a housing having a substantially flat, generally horizontal, central light supporting portion with first and second side members extending downwardly from opposite sides thereof to terminate in first and second lower edges, respectively;
   - first and second flanges attached, respectively, to the first and second lower edges of the first and second side members on opposite sides of the central light supporting portion;
   - a light attached to the central light supporting portion of the housing;
   - releasable clamps for securing the first and second flanges to an anti-cavitation plate on a drive shaft housing of an outboard motor or an outdrive unit in an overlying position on the anti-cavitation plate; and
   - an electrical connector for interconnecting the light with a source of electrical energy.

2. The safety light assembly according to claim 1 wherein the central light supporting portion of the housing is located in a first plane, and the first and second flanges are located in a second lower plane disposed at an angle to the first plane.

3. The safety light assembly according to claim 2 wherein the releasable clamps for securing the first and second flanges to an anti-cavitation plate are designed to effect removable securing without modification to the anti-cavitation plate.

4. The safety light assembly according to claim 3 wherein the first and second flanges have an upper side and a lower side for overlying an anti-cavitation plate, and wherein the lower side has a skid-resistant surface thereon.

5. The safety light assembly according to claim 4 wherein the releasable clamps are designed to squeeze together the first and second flanges and an anti-cavitation plate.

6. The safety light assembly according to claim 5 wherein the electrical connector is adapted to interconnect the light with the lighting system of a boat trailer.

7. The safety light assembly according to claim 6 further including blocking diodes for preventing feedthrough from trailer lights on one side of a boat trailer to the other while permitting trailer lights on either side of a boat trailer to energize the light on the central light supporting portion.

8. The safety light assembly according to claim 5 wherein the electrical connector is adapted to interconnect the light with the lighting system of a boat trailer.

9. The safety light assembly according to claim 6 further including blocking diodes for preventing feedthrough from trailer lights on one side of a boat trailer to the other while permitting trailer lights on either side of a boat trailer to energize the light on the central light supporting portion.

10. The safety light assembly according to claim 1 wherein the first and second flanges have an upper side and a lower side for overlying an anti-cavitation plate, and wherein the lower side has a skid-resistant surface thereon.

11. The safety light assembly according to claim 10 wherein the releasable-clamps for securing the- first and second flanges to an anti-cavitation plate are designed to effect removable securing without modification to the anti-cavitation plate.

12. The safety light assembly according to claim 1 wherein the releasable clamps are designed to squeeze together the first and second flanges and an anti-cavitation plate.

13. The safety light assembly according to claim 1 wherein the releasable clamps for securing the first and second flanges to an anti-cavitation plate are designed to effect removable securing without modification to the anti-cavitation plate.

* * * * *